United States Patent
Lee et al.

(10) Patent No.: US 9,874,661 B2
(45) Date of Patent: Jan. 23, 2018

(54) WAVELENGTH CONVERSION MEMBER, RELATED MANUFACTURING METHOD, AND RELATED BACKLIGHT ASSEMBLY

(71) Applicant: Samsung Display Co., Ltd., Yongin, Gyeonggi-Do (KR)

(72) Inventors: Sang Hyuk Lee, Anyang-si (KR); Seok Hyun Nam, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 818 days.

(21) Appl. No.: 14/293,837

(22) Filed: Jun. 2, 2014

(65) Prior Publication Data
US 2015/0226885 A1    Aug. 13, 2015

(30) Foreign Application Priority Data
Feb. 11, 2014    (KR) .......................... 10-2014-0015554

(51) Int. Cl.
*F21V 9/00*    (2015.01)
*G02B 1/18*    (2015.01)
*F21V 8/00*    (2006.01)
*G02F 1/1335*    (2006.01)

(52) U.S. Cl.
CPC ............... *G02B 1/18* (2015.01); *G02B 6/005* (2013.01); *G02F 2001/133614* (2013.01)

(58) Field of Classification Search
CPC .................. G02B 1/18; G02B 6/005
See application file for complete search history.

(56) References Cited

U.S. PATENT DOCUMENTS

| | | | | |
|---|---|---|---|---|
| 7,261,768 | B2 * | 8/2007 | Luten ..................... | B82Y 30/00 106/287.14 |
| 2007/0027232 | A1 * | 2/2007 | Walsh, Jr. ............ | C09D 183/04 523/218 |
| 2013/0215645 | A1 | 8/2013 | Jang et al. | |

FOREIGN PATENT DOCUMENTS

| | | |
|---|---|---|
| KR | 1020130009027 A | 1/2013 |
| KR | 1020130010380 A | 1/2013 |
| KR | 1020130023979 A | 3/2013 |
| KR | 1020130058550 A | 6/2013 |
| KR | 1020130072957 A | 7/2013 |
| KR | 1020130083807 A | 7/2013 |
| KR | 1020130110946 A | 10/2013 |

* cited by examiner

*Primary Examiner* — Thomas M Sember
(74) *Attorney, Agent, or Firm* — Innovation Cousel LLP

(57) ABSTRACT

A wavelength conversion member may include a first substrate and a second substrate that overlaps the first substrate. The wavelength conversion member may further include a wavelength conversion layer disposed between the first substrate and the second substrate in a first direction. The wavelength conversion member may further include a first hydrophobic membrane that overlaps at least one of the first substrate, the second substrate, and the wavelength conversion layer in a second direction perpendicular to the first direction.

20 Claims, 11 Drawing Sheets

WAVELENGTH CONVERSION MEMBER, RELATED MANUFACTURING METHOD, AND RELATED BACKLIGHT ASSEMBLY

CROSS-REFERENCE TO RELATED APPLICATION(S)

This application is based on and claims priority to Korean Patent Application No. 10-2014-0015554, filed on Feb. 11, 2014 in the Korean Intellectual Property Office, the disclosure of which is incorporated herein in its entirety by reference.

BACKGROUND

1. Field of the Invention

The present invention relates to a wavelength conversion member, a method for manufacturing the wavelength conversion member, and a backlight assembly including the wavelength conversion member.

2. Description of Related Art

A wavelength conversion member may be used in a backlight assembly of a display device that may display images according to input data. The display device may be, for example, a liquid crystal display, an electrophoretic display, an organic light emitting display, an inorganic electroluminescent (EL) display, a field emission display, a surface-conduction electron-emitter display, a plasma display, or a cathode ray display.

As an example, a liquid crystal display may include a liquid crystal layer arranged between two transparent substrates and may include a backlight assembly for providing light to the liquid crystal layer. Light transmission for each pixel of the liquid crystal display device may be adjusted by controlling liquid crystal molecules of the liquid crystal layer, for displaying a desired image.

The backlight assembly may include a light source portion, a light guide plate, a diffusion plate, a reflective plate, and various optical sheets.

In general, the light source portion may include a light source for emitting blue light and may include a wavelength conversion material positioned on the light source for converting the blue light into white light. The light source portion may provide the white light to the light guide plate or the diffusion plate, such that the liquid crystal layer may receive white light.

SUMMARY

Embodiments of the present invention may provide a sufficient distance between a wavelength conversion material and a corresponding light source and/or may substantially protect the wavelength conversion material from moisture. Advantageously, the characteristics of the wavelength conversion material may be substantially maintained, such that the performance of wavelength conversion material may remain satisfactory.

An embodiment of the invention may be related to a wavelength conversion member that may include a first substrate and a second substrate that overlaps the first substrate in a first direction. The wavelength conversion member may further include a wavelength conversion layer disposed between the first substrate and the second substrate (in the first direction). The wavelength conversion member may further include a first hydrophobic membrane that overlaps at least one of the first substrate, the second substrate, and the wavelength conversion layer in a second direction perpendicular to the first direction.

The wavelength conversion layer may include quantum dots.

The first hydrophobic membrane may include at least one of aerogel and octadecyltrichlorosilane.

The wavelength conversion member may include a second hydrophobic membrane that overlaps the first hydrophobic membrane in the second direction. A material of the first hydrophobic membrane may be different from a material of the second hydrophobic membrane.

The first hydrophobic membrane may include one of aerogel and octadecyltrichlorosilane, and the second hydrophobic membrane may include the other of aerogel and octadecyltrichlorosilane.

A first portion of the second hydrophobic membrane and/or a second portion of the second hydrophobic membrane may overlap at least one of the first substrate and the second substrate in the first direction. The first substrate, the second substrate, and/or the wavelength conversion layer may be disposed between the first portion of the second hydrophobic membrane and the second portion of the second hydrophobic membrane in the first direction.

The first portion of the second hydrophobic membrane may overlap an edge portion of the first substrate without overlapping a center portion of the first substrate in the first direction.

The second hydrophobic membrane may completely enclose the first substrate, the second substrate, the wavelength conversion layer, and/or the first hydrophobic membrane.

The wavelength conversion member may include a third hydrophobic membrane that overlaps the second hydrophobic membrane in the second direction and/or in the first direction. A material of the third hydrophobic membrane may be the same as a material of the first hydrophobic membrane.

The wavelength conversion member may include a fourth hydrophobic membrane positioned between the wavelength conversion layer and at least one of the first substrate and the second substrate. A material of the fourth hydrophobic membrane may be the same as a material of the second hydrophobic membrane.

The fourth hydrophobic membrane may completely enclose at least one of the first substrate and the second substrate.

The wavelength conversion member may include a sealant positioned between the first substrate and the second substrate in the first direction and positioned between the wavelength conversion layer and the first hydrophobic membrane in the second direction.

An embodiment of the present invention may be related to method for manufacturing a wavelength conversion member. The method may include providing a first substrate, a second substrate, and wavelength conversion layer positioned between the first substrate and the second substrate in a first direction. The method may further include providing a first hydrophobic membrane that overlaps at least one of the first substrate, the wavelength conversion layer, and the second substrate in a second direction perpendicular to the first direction.

The step of providing the first hydrophobic membrane may include applying a first hydrophobic solution on one or more side surfaces of at least one of the first substrate, the wavelength conversion layer, and the second substrate using a roller.

The step of providing the first hydrophobic membrane may include drying the first hydrophobic solution after applying the first hydrophobic solution.

The method may include providing a second hydrophobic membrane that overlaps the first hydrophobic membrane in the second direction. A material of the second hydrophobic membrane may be different from a material of the first hydrophobic membrane.

The step of providing the second hydrophobic membrane may include dipping one or more edge portions of at least one of the first hydrophobic membrane, the first substrate, the wavelength conversion layer, and the second substrate in a second hydrophobic solution provided in a container.

The step of providing the second hydrophobic membrane may include drying a portion of the second hydrophobic solution that is attached to one or more of the first hydrophobic membrane, the first substrate, the wavelength conversion layer, and the second substrate after the dipping.

An embodiment of the present invention may be related to a backlight assembly that may include a light source that is configured to emit first light that has a first wavelength. The backlight assembly may further include a wavelength conversion member that is configured to use the first light to generate second light that has a second wavelength different from the first wavelength. The wavelength conversion member may include a first substrate, a second substrate that overlaps the first substrate in a first direction, and a wavelength conversion layer disposed between the first substrate and the second substrate (in the first direction). The wavelength conversion member may further include at least one hydrophobic membrane that overlaps at least of the first substrate, the second substrate, and the wavelength conversion layer in a second direction perpendicular to the first direction.

The wavelength conversion layer may include quantum dots.

The light source may emit blue light, and the wavelength conversion layer may use the blue light to generate white light.

An embodiment of the present invention may be related to a wavelength conversion member that may include a first substrate, a second substrate overlapping and/or positioned on a top surface and/or bottom surface of the first substrate, a wavelength conversion layer interposed between the first substrate and the second substrate, and a first hydrophobic membrane positioned on side surfaces of at least one of the first substrate, the second substrate, and the wavelength conversion layer.

The wavelength conversion layer may include quantum dots.

The first hydrophobic membrane may include at least one of aerogel and octadecyltrichlorosilane.

The wavelength conversion member may further comprise a second hydrophobic membrane overlapping and/or positioned on the first hydrophobic membrane, wherein the first hydrophobic membrane and the second hydrophobic membrane may be made of different materials.

The first hydrophobic membrane may include one of aerogel and octadecyltrichlorosilane, and the second hydrophobic membrane may include the other of aerogel and octadecyltrichlorosilane.

End portions of the second hydrophobic membrane may extend to cover edge portions of the first substrate and the second substrate.

The wavelength conversion member may include a sealant positioned between the first substrate and the second substrate and overlapping at least one of the second hydrophobic membrane, the first hydrophobic membrane, and the wavelength conversion layer.

The second hydrophobic membrane may completely enclose and/or surround the first substrate, the second substrate, the wavelength conversion layer, and the first hydrophobic membrane.

The wavelength conversion member may include a third hydrophobic membrane overlapping and/or positioned on the second hydrophobic membrane, wherein the third hydrophobic membrane may be made of the same material as the first hydrophobic membrane.

The wavelength conversion member may include a fourth hydrophobic membrane positioned in at least one of a place between the first substrate and the wavelength conversion layer and a place between the second substrate and the wavelength conversion layer, wherein the fourth hydrophobic membrane may be made of the same material as the second hydrophobic membrane.

The fourth hydrophobic membrane may completely enclose and/or surround at least one of the first substrate and the second substrate.

An embodiment of the present invention may be related to a method for manufacturing a wavelength conversion member. The method may include successively providing and/or laminating a first substrate, a wavelength conversion layer, and a second substrate. The method may further include providing and/or coating a first hydrophobic membrane on side surfaces of at least one of the first substrate, the wavelength conversion layer, and the second substrate.

The step of coating the first hydrophobic membrane may include applying a first hydrophobic solution on the side surfaces of the at least one of the first substrate, the wavelength conversion layer, and the second substrate using a roller.

The step of coating the first hydrophobic membrane may include forming the first hydrophobic membrane by drying the first hydrophobic solution after applying the first hydrophobic solution.

The method may include providing and/or forming a second hydrophobic membrane that is made of a material different from a material of the first hydrophobic membrane on the first hydrophobic membrane after the step of coating the first hydrophobic membrane.

The step of providing and/or forming the second hydrophobic membrane may include dipping one or more edge portions of at least one of the first hydrophobic membrane, the first substrate, the wavelength conversion layer, and the second substrate in a second hydrophobic solution in a bath and/or container.

The step of providing and/or forming the second hydrophobic membrane may include forming the second hydrophobic membrane by drying a portion the second hydrophobic solution that attaches to one or more of the first hydrophobic membrane, the first substrate, the wavelength conversion layer, and the second substrate after the dipping.

An embodiment of the present invention may be related to a backlight assembly that may include a light source configured to emit first light. The backlight assembly may further include a wavelength conversion member configured to convert a wavelength of the first light to generate a second light. The wavelength conversion member may include a first substrate, a second substrate overlapping and/or positioned on a top surface and/or a bottom surface of the first substrate, a wavelength conversion layer interposed between the first substrate and the second substrate, and at least one hydrophobic membrane overlapping and/or positioned on side surfaces of at least one of the first substrate, the second substrate, and the wavelength conversion layer.

The wavelength conversion layer may include quantum dots.

The light source may emit blue light, and the wavelength conversion layer may convert the blue light into white light.

According to the embodiments of the present invention, since external moisture is prevented from penetrating into the wavelength conversion material, the characteristics of the wavelength conversion material can be substantially maintained. Advantageously, the optical characteristics and performance of the wavelength conversion member and the backlight assembly that includes the wavelength conversion material may be satisfactory.

Additional or alternative features, effects, and advantages may be provided according to embodiments of the present invention.

DETAILED DESCRIPTION OF THE EMBODIMENTS

Figure 1:
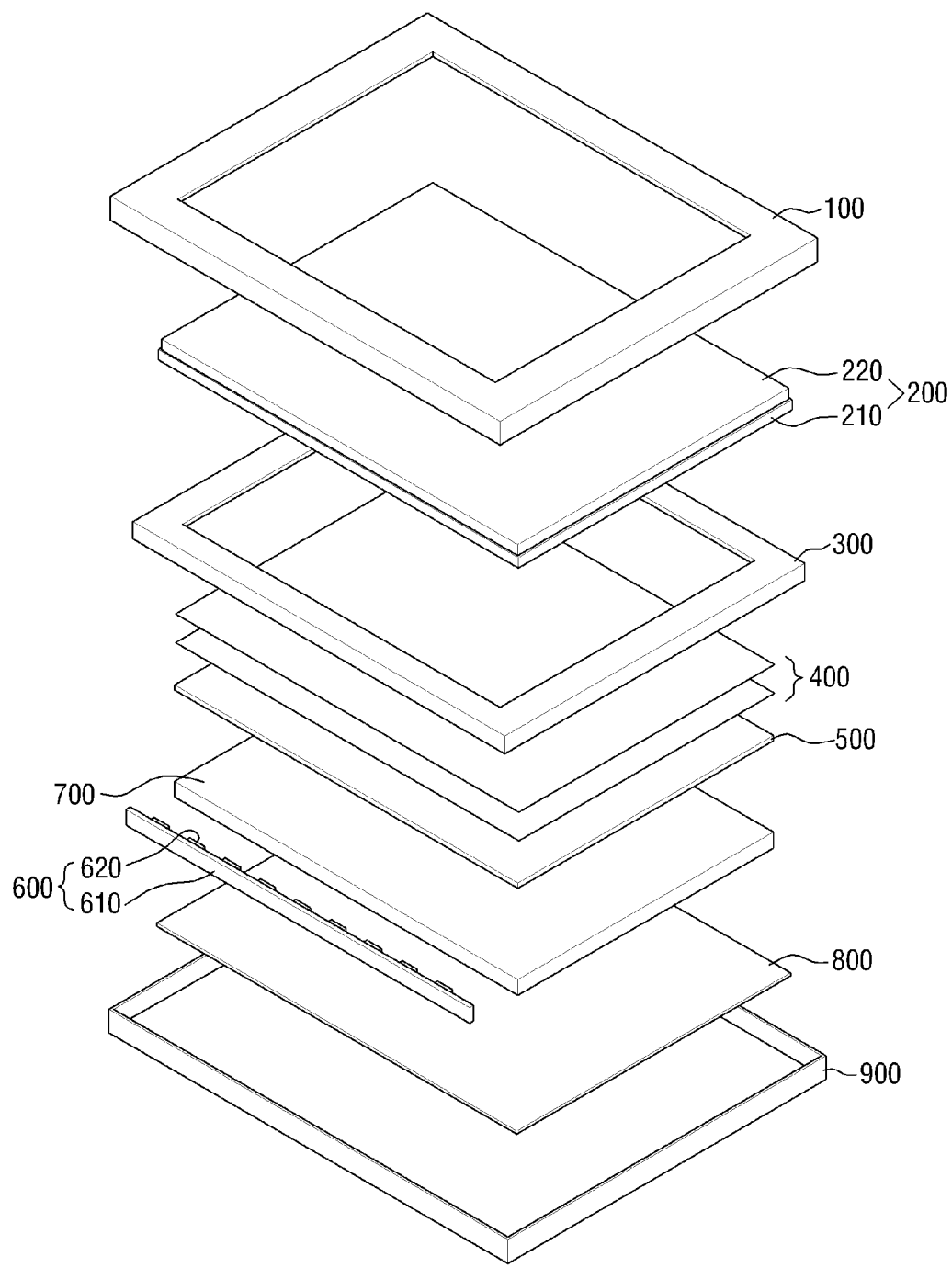
FIG. 1 is an exploded perspective view illustrating a display device according to an embodiment of the present invention.

Advantages and features of the present invention may be understood by reference to the following detailed description of embodiments and the accompanying drawings. The present invention may be embodied in many different forms and should not be construed as being limited to the embodiments set forth herein. These embodiments are provided so that this disclosure will be thorough and complete and will fully convey the concept of the invention to those skilled in the art. In some embodiments, well-known structures and devices are not shown in order not to obscure the description of the invention with unnecessary detail. Like numbers may refer to like elements in the description and drawings. In the drawings, thicknesses of layers and regions may be exaggerated for clarity.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

When a first element is referred to as being "on" or "connected to" a second element, the first element can be directly on or directly connected to the second element, or one or more intervening elements may be present. When a first element is referred to as being "directly on" or "directly connected to" a second element, there are no intended intervening elements (except, e.g., environmental elements) present or connected between the first element and the second element.

As used herein, the term "and/or" may include any and all combinations of one or more of the associated items.

Spatially relative terms, such as "below," "beneath," "lower," "above," "upper," and the like, may be used herein for ease of description of one element's relationship to another element(s) illustrated in the figures. The spatially relative terms are intended to encompass different orientations of the device and/or elements in use or operation in addition to the orientations depicted in the figures.

The illustrated plan views and/or cross-sectional views may represent ideal schematic views of embodiments of the invention. The illustrated views may be modified depending on manufacturing technologies and/or tolerances. Embodiments of the invention are not limited to those shown in the views, but include modifications in configurations according to manufacturing processes.

Same reference numerals may be used for indicating substantially identical or analogous elements illustrated in different drawing figures. Description of the elements may not be repeated.

FIG. 1 is an exploded perspective view illustrating a display device according to an embodiment of the present invention. Referring to FIG. 1, the display device includes a display panel 200, a backlight assembly, a top chassis 100, and a bottom chassis 900.

The display panel 200 is a panel that may displays an image. For example, the display panel 200 may be a liquid crystal display (LCD) panel, an electrophoretic display panel, an organic light emitting diode (OLED) panel, a light emitting diode (LED) panel, an inorganic electroluminescent (EL) display panel, a field emission display (FED) panel, a surface-conduction electron-emitter display (SED) panel, a plasma display panel (PDP), or a cathode ray tube (CRT) display panel. As an example, the display device may be a liquid crystal display, and the display panel 200 may be an LCD panel. In embodiments of the invention, the display device and the display panel 200 may be one or more of various types of display devices and display panels.

The display panel 200 may include a display region where an image is to be displayed according to input data and a non-display region where no updated image is displayed. The display region may be surrounded by the non-display region. The display panel 200 may include a first display substrate 210, a second display substrate 220 that faces (and/or overlaps) the first display substrate 210, and a liquid crystal layer (not illustrated) interposed between the first display substrate 210 and the second display substrate 220.

Each of the first display substrate 210 and the second display substrate 220 may be have a substantially rectangular prism shape, as illustrated in FIG. 1. In embodiments, the shapes of the first display substrate 210 and the second display substrate 220 are not limited thereto, and the first display substrate 210 and the second display substrate 220 may have one or more of various shapes according to the intended shape of the display panel 200.

The liquid crystal layer may be interposed between the first display substrate 210 and the second display substrate 220. In embodiments, between the first display substrate 210 and the second display substrate 220, a sealing member may be arranged along edge portions of the first display substrate 210 and the second display substrate 220 to attach the first display substrate 210 and the second display substrate 220 and/or to seal the liquid crystal layer.

Although not illustrated in FIG. 1, the display panel 200 may include a driving portion and a flexible circuit board that may be attached to the first display substrate 210 or the second display substrate 220. The driving portion may apply various signals, such as driving signals, required for displaying an image on the display region. The flexible circuit board may output various kinds of signals to the driving portion.

The backlight assembly may overlap and/or be arranged below the display panel 200. The backlight assembly may provide light to the display panel 200. In embodiments, the backlight assembly may be an edge type backlight assembly, in which a light source portion 600 is positioned on or adjacent to a side surface of a light guide plate 700. In embodiments of the present invention, to the backlight assembly may be a direct type backlight assembly, in which a light source portion 600 overlaps and/or is positioned on or adjacent to a lower surface of a diffusion plate.

The backlight assembly may include the light source portion 600, the light guide plate 700, a wavelength conversion member 500, an optical sheet 400, a reflective plate 800, and a mold frame 300.

The light source portion 600 may generate light and may irradiate the generated light onto the light guide plate 700. The light source portion 600 may overlap and/or may be arranged on or adjacent to a side surface, that is, a light incident surface, of the light guide plate 700. In an embodiment, the light source portion 600 may be arranged to correspond to a long side of the light guide plate 700. In an embodiment, the light source portion may be arranged to correspond to a short side of the light guide plate 700.

The light source portion may include a circuit board 610 and a plurality of light sources 620 arranged on the circuit board 610.

The circuit board 610 may overlap and/or may be arranged on or adjacent to the light incident surface of the light guide plate 700. The circuit board 610 may be connected to a power supply (not illustrated) to transmit electric energy to the light sources 620. The shape of a surface of the circuit board 610 that faces the light incident surface of the light guide plate 700 may correspond to (e.g., may be identical to) the shape of the light incident surface of the light guide plate 700. In an embodiment, a surface of the circuit board 610 may be parallel to the light incident plate of the light guide plate 700. In an embodiment, the area of a surface of the circuit board 610 may be substantially equal to the area of the light incident surface of the light guide plate 700.

The plurality of light sources 620 may be arranged on a surface of the circuit board 610. The plurality of light sources 620 may convert the electric energy that is transmitted through the circuit board 610 into optical energy. The plurality of light sources 620 may be arranged to be spaced apart from each other by a predetermined distance. The plurality of light sources 620 may be arranged in a line. The plurality of light sources 620 may be arranged to correspond to the shape of the light incident surface of the light guide plate 700 that faces the plurality of light sources 620. The plurality of light sources 620 may be light emitting diodes (LEDs). The plurality of light sources 620 may emit blue light. In an embodiment, the light sources 620 may be blue light emitting diodes that emit blue light.

In an embodiment, as can be appreciated from FIG. 1, a surface of the circuit board 610 that contacts the light sources 620 is parallel to the light incident surface. In an embodiment, a surface of the circuit board 610 that contacts the light source 620 may be perpendicular to the light incident surface. In an embodiment, the light source portion 600 may have a side emitting structure. In an embodiment, a separate reflective layer for guiding the light emitted from the light sources 620 in the direction of the light incident surface may be formed on the light sources 620.

A side of the light guide plate 700 may substantially overlap the light source portion 600. The light guide plate 700 may be positioned on substantially the same plane and/or same level as the light source portion 600. The light guide plate 700 may guide the light irradiated from the light source portion 600 toward the wavelength conversion member 500.

The light guide plate 700 may be made of a transparent material. In an embodiment, the light guide plate 700 may be made of polymethyl-methacrylate (PMMA). The light guide plate 700 may be made of one or more various transparent materials capable of guiding the light. The light guide plate 700 may be made of a rigid material or a flexible material.

The light guide plate 700 may have a substantially rectangular prism or cuboidal plate shape. In embodiments, the light guide plate 700 may have one or more of various shapes.

The wavelength conversion member 500 may overlap and/or may be positioned on the light guide plate 700. In an embodiment, the wavelength conversion member 500 may be interposed between the light guide plate 700 and the optical sheet 400. In an embodiment, the wavelength conversion member 500 may be interposed between the light source portion 600 and the light guide plate 700.

The light conversion member 500 may convert the emitted light emitted from the light guide plate 700 and/or from the light source portion 600 into a processed light having a longer wavelength than the emitted light. In an embodiment, the wavelength conversion member 500 may convert blue light emitted from the light guide plate 700 and/or from the light source portion 600 into white light.

The area of a surface of the wavelength conversion member 500 that overlaps the light guide plate 700 may be substantially equal to the area of an upper surface of the light guide plate 700. The area of the surface of the wavelength conversion member 500 may be substantially equal to the area of a surface of the optical sheet 400 that overlaps the wavelength conversion member 500. The wavelength conversion member 500 will be further described with reference to other figures.

The optical sheet 400 may overlap and/or may be arranged on or adjacent to an upper portion of the wavelength conversion member 500. The optical sheet 400 may modulate the optical characteristics of the processed light emitted from the wavelength conversion member 500. A plurality of optical sheets 400 may be provided. The plurality of optical sheets 400 may be stacked to overlap each other and/or to supplement each other. In an embodiment, the plurality of optical sheets 400 may include at least one of a prism sheet and a diffusion sheet.

The reflective plate 800 may overlap and/or may be arranged on or adjacent to a lower side of the light guide plate 700. The reflective plate 800 may reflect light emitted from the light source portion 600 and travelling to the lower side of the light guide plate 700 toward the wavelength conversion member 500. The reflective plate 800 may be made of a reflective material, for example, metal.

A portion of the mold frame 300 may be arranged between the display panel 200 and the optical sheet 400. The mold frame 300 is engaged with the bottom chassis 900 to fix and/or accommodate the light source portion 600, the light guide plate 700, a reflective member, the wavelength conversion member 500, the optical sheet 400, and the reflective plate 800. The mold frame 300 may contact an edge portion of the display panel 200 to support and fix the display panel 200.

A portion of the top chassis 100 may cover the display panel 200. The top chassis 100 may surround the side surfaces of the display panel 200 and/or the backlight assembly. The bottom chassis 900 may accommodate the backlight assembly. The top chassis 100 and the bottom chassis 900 are engaged with each other to surround the display panel 200 and the backlight assembly. The top chassis 100 and the bottom chassis 900 may be made of a heat and/or electricity conductive material, for example, metal.

Figure 2:
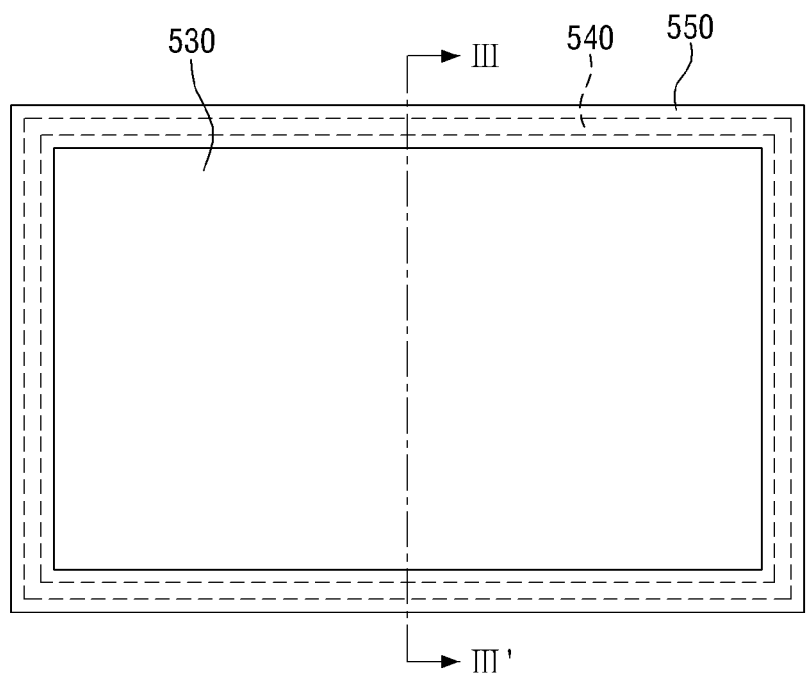
FIG. 2 is a plan view illustrating a wavelength conversion member of the display device illustrated in FIG. 1.
Figure 3:
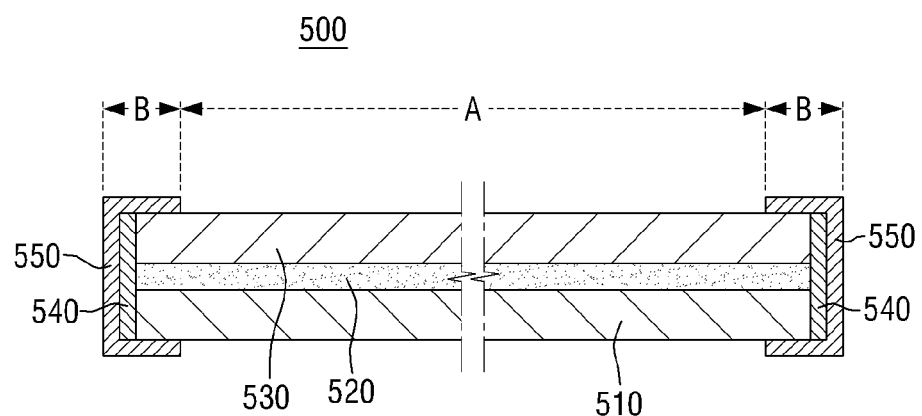
FIG. 3 is a cross-sectional view taken along line III-III' indicated in FIG. 2.

FIG. 2 is a plan view illustrating the wavelength conversion member 500 of the display device illustrated in FIG. 1. FIG. 3 is a cross-sectional view taken along line III-III' indicated in FIG. 2.

Referring to FIGS. 2 and 3, the wavelength conversion member 500 may include a first substrate 510, a wavelength conversion layer 520, a second substrate 530, a first hydrophobic membrane 540, and a second hydrophobic membrane 550.

The first substrate 510 may be positioned on the light guide plate 700 and/or positioned between the light guide plate 700 and the second substrate 540. The first substrate 510 may overlap and/or may be positioned on a lower portion of the wavelength conversion layer 520. The first substrate 510 may direct contact a lower surface of the wavelength conversion layer 520. The first substrate 510 may be transparent. The first substrate 510 may have flexibility. The first substrate 510 may have a substantially rectangular prism shape and/or a cuboidal plate shape. In embodiments, the shape of the first substrate 510 may be configured according to the shape of the display panel 200 and/or the light guide plate 700.

The first substrate 510 may be made of a material that can protect the wavelength conversion layer 520 from physical impact and/or external moisture. In an embodiment, the first substrate 510 may include a heat and/or electricity insulating material, for example, silicon oxide (SiOx), silicon nitride (SiNx), or a combination of SiOx and SiNx. In an embodiment, the first substrate 510 may be a plastic film made of polyethylene phthalate (PET) or polycarbonate (PC). In an embodiment, the first substrate 510 may be made of a glass material.

The wavelength conversion layer 520 may overlap and/or may be positioned on the first substrate 510. The wavelength conversion layer 520 may be interposed between the first substrate 510 and the second substrate 530. In an embodiment, the wavelength conversion layer 520 may completely overlap each of the first substrate 510 and the second substrate 530. In an embodiment, the wavelength conversion layer 520 may overlap and/or be positioned at a center region of the first substrate 510 without overlapping any other portion of the first substrate 510. The wavelength conversion layer 520 may convert light that has a first wavelength and is incident to the wavelength conversion layer 520 to processed light that has a second wavelength. For example, the wavelength conversion layer 520 may convert blue light that is incident to the wavelength conversion layer 520 into white light.

The wavelength conversion layer 520 may include a wavelength conversion material, for example, phosphor, quantum dots, or a combination of phosphor and quantum dots.

The phosphor may be a general organic or inorganic phosphor. In an embodiment, the phosphor may be yellow phosphor. The yellow phosphor may be a YAG-based phosphor material, a silicate-based phosphor material, an oxynitride phosphor material, or a combination of at least two of the aforementioned phosphor materials.

A quantum dot may be a semiconductor nano-particle of a core-shell structure having a size in the range of several to several tens of nanometers (nm) and having the characteristics that the emitted light differs depending on the size of the particle according to a quantum confinement (or quanfinement) effect. The quantum dot may generate strong light in a narrow wavelength range, and the light emitted from the quantum dot is generated as unstable (unsteady) electrons that come down from a conduction band to a valence band. A quantum dot having a smaller particle may generate light of a shorter wavelength; a quantum dot having a larger particle may generate light of a longer wavelength. Through configuration of the size of the quantum dots, visible light of a desired wavelength can be output.

The quantum dot may include at least one of a Si-based nanocrystal, a II-IV group-based compound semiconductor nanocrystal, a III-V group-based compound semiconductor nanocrystal, a IV-VI group-based compound nanocrystal, and a mixture of some of the aforementioned nanocrystals.

The II-VI group-based compound semiconductor nanocrystal may include at least one of CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

The III-V group-based compound semiconductor nanocrystal may include at least one of GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs. The IV-VI group-based compound semiconductor nanocrystal may be SbTe.

The wavelength conversion layer 520 may include only one kind of quantum dots having the same size or may include at least two kinds of quantum dots having different sizes.

The wavelength conversion layer 520 may further include a dispersive medium (e.g., an organic solvent or resin) that disperses the wavelength conversion material. The wavelength conversion material, such as phosphor or quantum dots may be dispersed in and/or naturally coordinated with the dispersive medium. The dispersive medium may be a transparent medium that does not substantially influence the wavelength conversion performance of the phosphor or quantum dot and does not substantially reflect or absorb light.

The organic solvent may include, for example, at least one of toluene, chloroform, and ethanol. The resin may include, for example, at least one of epoxy, silicone, polystyrene, and acrylate.

The wavelength conversion layer 520 may further include at least one of a UV initiator, thermosetting additives, a crosslinker, and a diffuser, which may be mixed with the wavelength conversion material.

The second substrate 530 may overlap and/or be arranged on the wavelength conversion layer 520. The second substrate 530 may be in direct contact with an upper surface of the wavelength conversion layer 520. The second substrate 530 may be transparent. The second substrate 530 may have flexibility. The second substrate 530 may have a substantially rectangular prism shape and/or a substantially cuboidal plate shape. The shape of the second substrate 530 may be configured according to the shape of the display panel 200 and/or the light guide plate 700. The shape of the second substrate 530 may be substantially the same as the shape of the first substrate 510.

The second substrate 530 may be made of a material that can protect the wavelength conversion layer 520 from physical impact and/or external moisture. In an embodiment, the second substrate 530 may include a heat and/or electricity insulating material, for example, silicon oxide (SiOx), silicon nitride (SiNx), or a combination of SiOx and SiNx. In an embodiment, the second substrate 530 may be a plastic film made of polyethylene phthalate (PET) or polycarbonate (PC). In an embodiment, the second substrate 530 may be made of a glass material. In an embodiment, the second substrate 530 may be made of the same material as the first substrate 510.

The first hydrophobic membrane 540 may be positioned along and/or on side surfaces of the first substrate 510, the second substrate 530, and the wavelength conversion layer 520. For example, the first hydrophobic membrane 540 may cover all side surfaces of the first substrate 510, the second substrate 530, and the wavelength conversion layer 520. The first hydrophobic membrane 540 may surround all the edges of the first substrate 510, the second substrate 530, and the wavelength conversion layer 520. In an embodiment, side surfaces of the first substrate 510, the second substrate 530, and the wavelength conversion layer 520 may be positioned on the same plane, and in this case, the cross section of a surface of the first hydrophobic membrane 540 may be in the form of a straight line. The first hydrophobic membrane 540 may perform a sealing member function that combines the first substrate 510 and the second substrate 530 with each other. The wavelength conversion layer 520 may be surrounded by the first substrate 510, the second substrate 530, and the first hydrophobic membrane 540. A height of the first hydrophobic membrane 540 may be substantially equal to a sum of thicknesses of the first substrate 510, the second substrate 530, and the wavelength conversion layer 520.

The first hydrophobic membrane 540 may include a hydrophobic material. In an embodiment, the first hydrophobic membrane 540 may include at least one of aerogel and octadecyltrichlorosilane (OTS). Since the aerogel and octadecyltrichlorosilane are very stable as compared with a general hydrophobic material containing fluorine, they may not react on the wavelength conversion material in the wavelength conversion layer 520. That is, even if the first hydrophobic membrane 540 comes in direct contact with the wavelength conversion layer 520, it does not cause characteristic deterioration of the wavelength conversion layer 520.

The second hydrophobic membrane 550 may enclose and/or be positioned on the first hydrophobic membrane 540. The second hydrophobic membrane 550 may surround all the edges of the first substrate 510, the second substrate 530, and the wavelength conversion layer 520. In an embodiment, upper and lower end portions of the second hydrophobic membrane 550 may extend to cover the edge portions of the bottom surface of the first substrate 510 and the top surface the second substrate 530. That is, the cross-sectional shape of the second hydrophobic membrane 550 may be a "C" shape. The upper end portion of the second hydrophobic membrane 550 may contact both the top surface of the second substrate 530 and the top surface of the first hydrophobic membrane 540. The lower end portion of the second hydrophobic membrane 550 may contact both the bottom surface of the first substrate 510 and the bottom surface of the first hydrophobic membrane 540. An intermediate portion of the second hydrophobic membrane 550 may be positioned connected between the upper end portion of the second hydrophobic membrane 550 and the lower end portion of the second hydrophobic membrane 550. The first hydrophobic membrane 540 may be disposed between the intermediate portion of the second hydrophobic membrane 550 and at least one of the first substrate 510, the second substrate 530, and the wavelength conversion layer 520.

The second hydrophobic membrane 550 may include a hydrophobic material. In an embodiment, the second hydrophobic membrane 550 may include at least one of aerogel and octadecyltrichlorosilane (OTS).

The second hydrophobic membrane 550 may be made of a material that is different from the material of the first hydrophobic membrane 540. In an embodiment, if the first hydrophobic membrane 540 includes one of aerogel and octadecyltrichlorosilane, the second hydrophobic membrane 550 may include the other of aerogel and octadecyltrichlorosilane. Since octadecyltrichlorosilane has an excellent water repellent function as compared with aerogel, in an embodiment, the first hydrophobic membrane 540 that is adjacent to the wavelength conversion layer 520 is made of octadecyltrichlorosilane, and the second hydrophobic membrane 550 that is positioned on the first hydrophobic membrane 540 is made of aerogel.

The wavelength conversion member 500 may include a center portion A and an edge portion B that surrounds the center portion A. In an embodiment, the center portion A of the wavelength conversion member 500 may be a region where the first hydrophobic membrane 540 and the second hydrophobic membrane 550 are not positioned and/or do not contact, and the edge portion B of the wavelength conversion member 500 may be a region where at least one of the first hydrophobic membrane 540 and the second hydrophobic membrane 550 is positioned and/or contacts. In an embodiment, the center portion A of the wavelength conversion member 500 may correspond to the display region of the display panel 200, and the edge portion B of the wavelength conversion member 500 may correspond to the non-display region of the display panel 200.

According an embodiment of the present invention, the wavelength conversion layer 520 may include quantum dots, and thus color reproduction of the backlight assembly can be improved. Since the wavelength conversion layer 520 is protected by the first hydrophobic membrane 540 and the second hydrophobic membrane 550, the characteristics of the wavelength conversion layer 520 can be prevented from being substantially affected by external moisture. In particular, the first hydrophobic membrane 540 and the second hydrophobic membrane 550 that is made of a different material from the first hydrophobic membrane 540 may effectively prevent external moisture from penetrating into the wavelength conversion layer 520. The edge portion of the wavelength conversion 500 where the first hydrophobic membrane 540 and/or the second hydrophobic membrane 550 are positioned corresponds to the non-display region. Therefore, the hydrophobic membranes may not require additional luminance adjustment.

Figure 4:
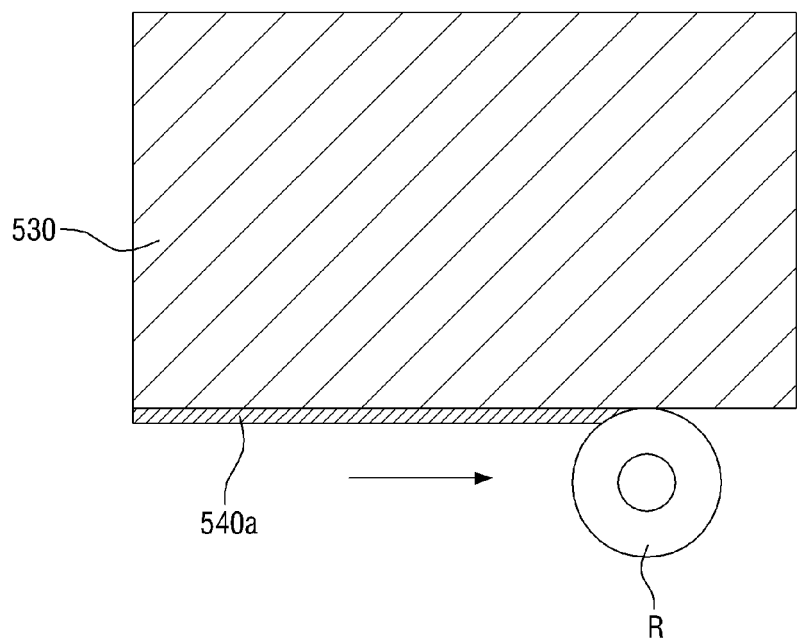
FIGS. 4 and 5 are views for explaining processes of a method for manufacturing the wavelength conversion member illustrated in FIG. 2.
Figure 5:
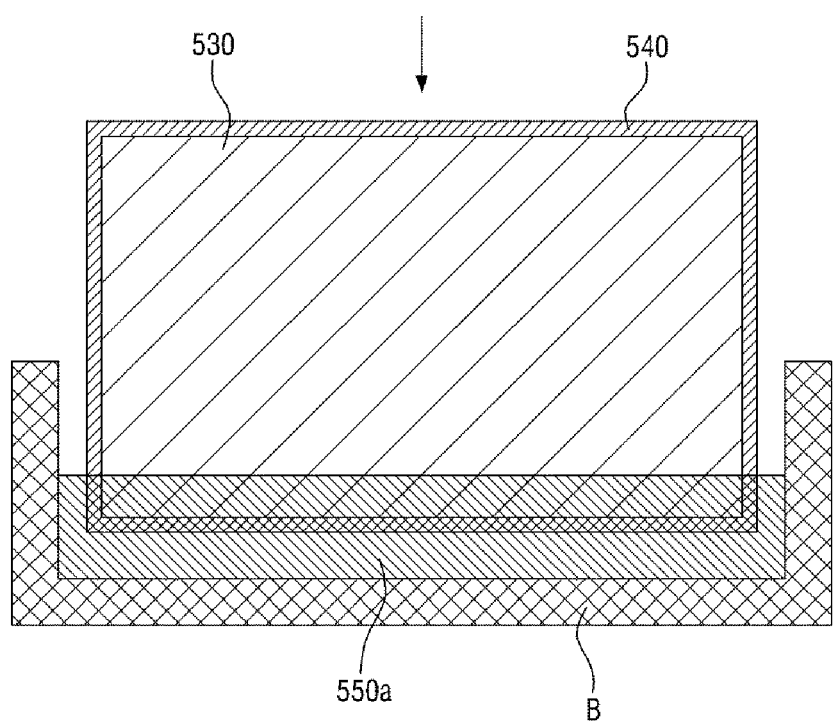

FIGS. 4 and 5 are views for explaining processes of a method for manufacturing the wavelength conversion member 500 illustrated in FIG. 1 and FIG. 2. The first substrate 510 and the wavelength conversion layer 520 illustrated in FIG. 3 overlap the second substrate 530 and are not illustrated in FIGS. 4 and 5.

First, referring to FIG. 4, a first hydrophobic solution 540a is spread on side surfaces of the first substrate, the wavelength conversion layer, and the second substrate 530. The first hydrophobic solution 540a may be an early-stage constituent element of the first hydrophobic membrane 540. That is, the first hydrophobic solution 540a may include a material of the first hydrophobic membrane 540 and an organic solvent, for example, ethanol, methanol, or benzene. Subsequently, the first hydrophobic solution 540a is dried, and the organic solvent is removed, such that the first hydrophobic membrane 540 may be formed. In an embodiment, the first hydrophobic solution 540a may include octadecyltrichlorosilane having a concentration in a range of about 5% to 30%.

The first hydrophobic solution 540a may be spread using a roller R. The first hydrophobic solution 540a may be spread rapidly, easily, and uniformly.

The first hydrophobic membrane 540 may be formed through a drying process after the first hydrophobic solution 540a is spread on all the side surfaces of the first substrate, the wavelength conversion layer, and the second substrate 530.

Next, referring to FIG. 5, a second hydrophobic solution 550a is provided on edge portions of the first substrate, the wavelength conversion layer, the second substrate 530, and the first hydrophobic membrane 540, by dipping the edge portions of the first substrate, the wavelength conversion layer, the second substrate 530, and the first hydrophobic membrane 540 in the second hydrophobic solution 550a in a bath B (or container B). The second hydrophobic solution 550a may include a material of the second hydrophobic membrane 550 and an organic solvent, for example, ethanol, methanol, or benzene. Subsequently, the second hydrophobic solution 550a is dried, and the organic solvent is removed, such that the second hydrophobic membrane 550 may be formed. In an embodiment, the second hydrophobic solution 550a may include aerogel having a concentration in a range of about 20% to 80%.

The second hydrophobic solution 550a may be positioned in the bath B, and the second hydrophobic solution 550a is provided on the edge portions of the first substrate, the second substrate 530, the wavelength conversion layer, and the first hydrophobic membrane 540 by dipping the edge portions of the first substrate, the second substrate 530, the wavelength conversion layer, and the first hydrophobic membrane 540 in the second hydrophobic solution 550a and then separating the first substrate, the second substrate 530, the wavelength conversion layer, and the first hydrophobic membrane 540 from the bath B. The second hydrophobic solution 550a may be formed rapidly, easily, and uniformly.

The second hydrophobic membrane 550 may be formed through a drying process after the second hydrophobic solution 550a has been provided on the edge portions of the first substrate, the wavelength conversion layer, the second substrate 530, and the first hydrophobic membrane 540.

According an embodiment of the present invention, the first hydrophobic membrane 540 and the second hydrophobic membrane 550, which protect the wavelength conversion layer against external moisture, can be uniformly formed in the simple and rapid method.

Figure 6:
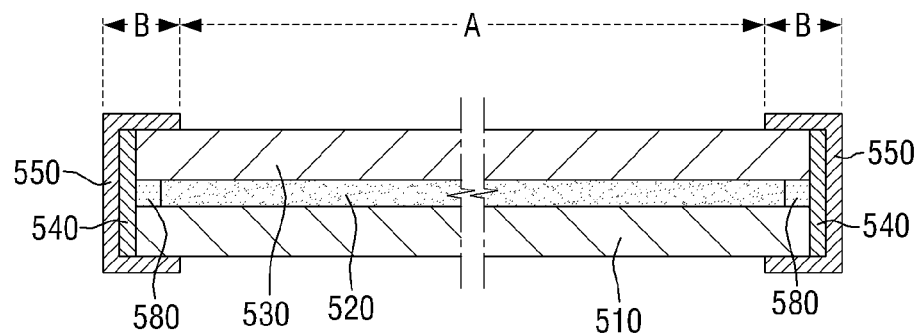
FIGS. 6 to 11 are cross-sectional views illustrating wavelength conversion members according to embodiments of the present invention.

FIG. 6 is a cross-sectional view illustrating a wavelength conversion member 501 according to an embodiment of the present invention.

Referring to FIG. 6, the wavelength conversion member 501 may include a sealant 580 in addition to some elements described with reference to FIG. 5. The sealant 580 may be made of glass frit. The sealant 580 may seal and/or surround a wavelength conversion layer 520 and may combine the first substrate 510 and the second substrate 530 with each other.

The sealant 580 may be positioned between the first substrate 510 and the second substrate 530. The sealant 580 may be positioned on the edge portions of the first substrate 510 and the second substrate 530. The sealant 580 may overlap the second hydrophobic membrane 550 and may be positioned between the upper end portion of the second hydrophobic membrane 550 and the lower end portion of the second hydrophobic membrane 550. The sealant 580 may be positioned between the wavelength conversion layer 520 and the first hydrophobic membrane 540. In an embodiment, the inner side surface of the sealant 580 may be positioned on the same plane as the end portion of the second hydrophobic membrane 550. The wavelength conversion layer 520 may be positioned in the center regions of the first substrate 510 and the second substrate 530 without overlapping other regions of the substrates.

The sealant 580 may enhance protection of the wavelength conversion layer 520 against external influence.

Figure 7:
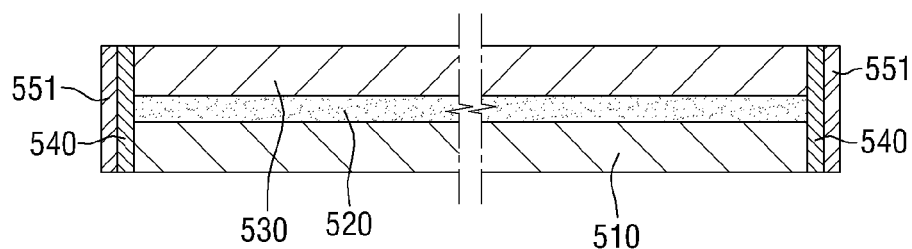

FIG. 7 is a cross-sectional view illustrating a wavelength conversion member 502 according to an embodiment of the present invention.

Referring to FIG. 7, a second hydrophobic membrane 551 may directly contact the first hydrophobic membrane 540 without contacting any of the first substrate 510, the second substrate 530, and the wavelength conversion layer 520. End portions of the second hydrophobic membrane 551 may not contact the top surface and bottom surface of the first hydrophobic membrane 540. The second hydrophobic membrane 551 may be formed using a roller in the same manner as the first hydrophobic membrane 540.

Since both the first hydrophobic membrane 540 and the second hydrophobic membrane 551 are formed using a roller, the process of forming the first hydrophobic membrane 540 and the second hydrophobic membrane 551 can be simplified.

Figure 8:
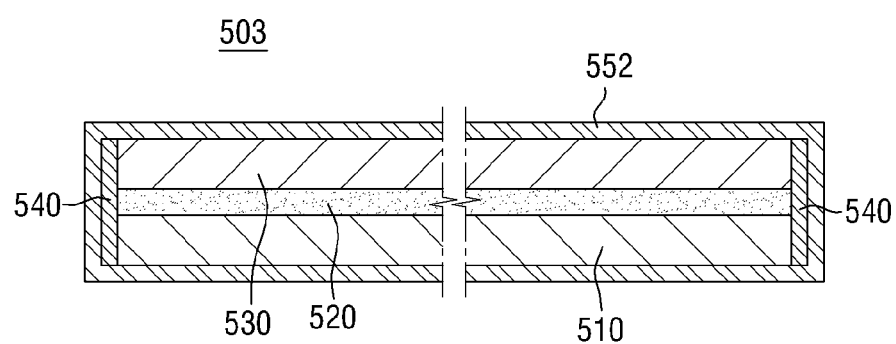

FIG. 8 is a cross-sectional view illustrating a wavelength conversion member 503 according to an embodiment of the present invention.

Referring to FIG. 8, a second hydrophobic membrane 552 may completely surround and/or enclose the first substrate 510, the second substrate 530, the wavelength conversion layer 520, and the first hydrophobic membrane 540. The second hydrophobic membrane 552 may cover edge regions and center regions of the first substrate 510 and the second substrate 530.

The second hydrophobic membrane 552 forms an entire outer surface of the wavelength conversion member 503; therefore, the process of forming and positioning the second hydrophobic membrane 552 may be simplified. The second hydrophobic membrane 552 may be made of aerogel, and the first substrate 510 and the second substrate 530 may be made of a glass material. Since the refractive indexes of the aerogel and the glass material are substantially equal to each other, the luminance of light that passes through the wavelength conversion member 503 may be substantially maintained.

Figure 9:
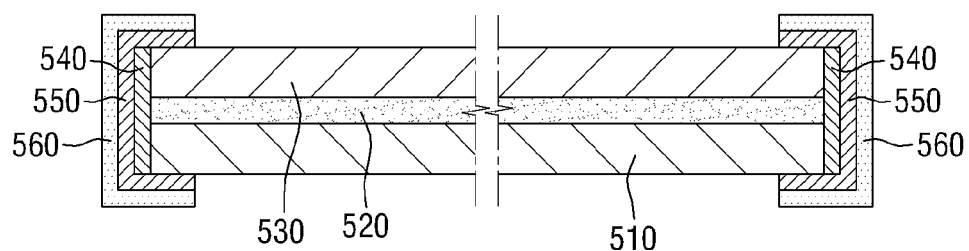

FIG. 9 is a cross-sectional view illustrating a wavelength conversion member 504 according to an embodiment of the present invention.

Referring to FIG. 9, the wavelength conversion member 504 may further include a third hydrophobic membrane 560. The third hydrophobic membrane 560 may be positioned on the second hydrophobic membrane 550. The shape of the third hydrophobic membrane 560 may be substantially similar to the shape of the second hydrophobic membrane 550. The third hydrophobic membrane 560 may be made of a material that is different from the material of the second hydrophobic membrane 550, but may be made of a material that is the same as the material of the first hydrophobic membrane 540. The third hydrophobic membrane 560 may enhance moisture interception of the wavelength conversion member 504.

Figure 10:
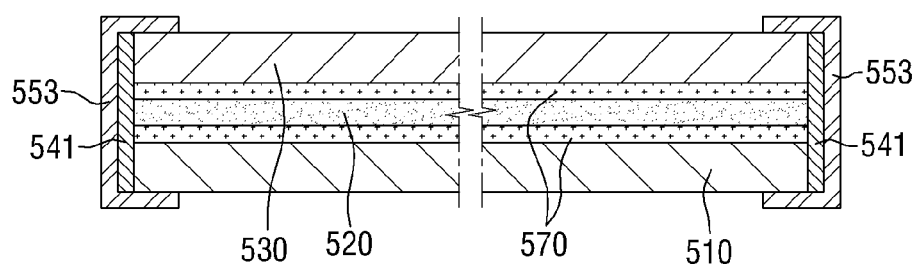

FIG. 10 is a cross-sectional view illustrating a wavelength conversion member 505 according to an embodiment of the present invention.

Referring to FIG. 10, the wavelength conversion member 505 may further include a fourth hydrophobic membrane 570. The fourth hydrophobic membrane 570 may be positioned in at least one of a place between the first substrate 510 and the wavelength conversion layer 520 and a place between the second substrate 530 and the wavelength conversion layer 520. In an embodiment illustrated in FIG. 10, the fourth hydrophobic membrane 570 is positioned in the place between the first substrate 510 and the wavelength conversion layer 520 and the place between the second substrate 530 and the wavelength conversion layer 520. The fourth hydrophobic membrane 570 may be positioned in one of the place between the first substrate 510 and the wavelength conversion layer 520 and the place between the second substrate 530 and the wavelength conversion layer 520. The fourth hydrophobic membrane 570 may be made of a material that is different from the material of a first hydrophobic membrane 541, but may be made of a material that is the same as the material of a second hydrophobic membrane 553. For example, the fourth hydrophobic membrane 570 and the second hydrophobic membrane 553 may be both made of aerogel. Given the presence of the fourth hydrophobic membrane 570, the entire thickness of the wavelength conversion member 505 may be greater than the thickness of the wavelength conversion member 505 illustrated in FIG. 3, and/or the lengths of the first hydrophobic membrane 541 and the second hydrophobic membrane 553 may be greater than the lengths of the first hydrophobic membrane 540 and the second hydrophobic membrane 550 illustrated in FIG. 3.

The fourth hydrophobic membrane 570 may effectively protect the wavelength conversion layer 520 against moisture that penetrates from the upper and lower portions of the wavelength conversion member 505 through the first substrate 510 and the second substrate 530. The fourth hydrophobic membrane 570 may be made of aerogel, and the first substrate 510 and the second substrate 530 may be made of a glass material. Since the refractive indexes of the aerogel and the glass material are substantially equal to each other, and the luminance of light that passes through the wavelength conversion member 505 may be substantially maintained.

Figure 11:
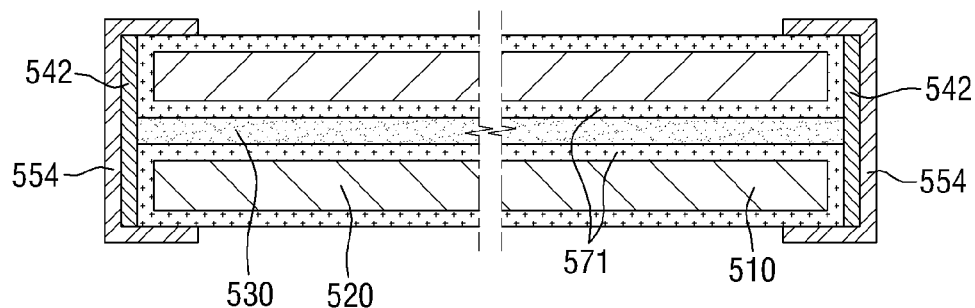

FIG. 11 is a cross-sectional view illustrating a wavelength conversion member 506 according to an embodiment of the present invention.

Referring to FIG. 11, a fourth hydrophobic membrane 571 may completely surround and/or enclose at least one of the first substrate 510 and the second substrate 530. As illustrated in FIG. 11, the fourth hydrophobic membrane 571 may completely surround both the first substrate 510 and the second substrate 530. The fourth hydrophobic membrane 571 may completely surround one of the first substrate 510 and the second substrate 530. Given the presence of the fourth hydrophobic membrane 571, the entire thickness of the wavelength conversion member 506 may be greater than the thickness of the wavelength conversion member 505 illustrated in FIG. 3, and/or the lengths of a first hydrophobic membrane 542 and a second hydrophobic membrane 554 may be greater than the lengths of the first hydrophobic membrane 540 and the second hydrophobic membrane 550 illustrated in FIG. 3.

The fourth hydrophobic membrane 571 may effectively protect the wavelength conversion layer 520 against moisture that penetrates from the upper and lower portions of the wavelength conversion member 505 into through the first substrate 510 and the second substrate 530 can be securely intercepted. The fourth hydrophobic membrane 571 may be made of aerogel and the first substrate 510, and the second substrate 530 may be made of a glass material. Since the refractive indexes of the aerogel and the glass material are substantially equal to each other, the luminance of light that passes through the wavelength conversion member 506 may be substantially maintained.

Although embodiments of the present invention have been described for illustrative purposes, those skilled in the art will appreciate that various modifications, additions, and substitutions are possible, without departing from the scope and spirit of the invention as defined in the accompanying claims.

What is claimed is:

1. A wavelength conversion member comprising:
   a first substrate;
   a second substrate overlapping the first substrate;
   a wavelength conversion layer disposed between the first substrate and the second substrate in a first direction;
   a first hydrophobic membrane overlapping at least one of the first substrate, the second substrate, and the wavelength conversion layer in a second direction perpendicular to the first direction; and
   a second hydrophobic membrane overlapping the first hydrophobic membrane in the second direction,
   wherein a material of the first hydrophobic membrane is different from a material of the second hydrophobic membrane.

2. The wavelength conversion member of claim 1, wherein the wavelength conversion layer includes quantum dots.

3. The wavelength conversion member of claim 1, wherein the first hydrophobic membrane includes at least one of aerogel and octadecyltrichlorosilane.

4. The wavelength conversion member of claim 1, wherein the second hydrophobic membrane overlaps at least one of the first substrate, the second substrate, and the wavelength conversion layer.

5. The wavelength conversion member of claim 4, wherein the first hydrophobic membrane includes one of aerogel and octadecyltrichlorosilane, and
   the second hydrophobic membrane includes the other of aerogel and octadecyltrichlorosilane.

6. The wavelength conversion member of claim 4, wherein a portion of the second hydrophobic membrane overlap at least one of the first substrate and the second substrate in the first direction.

7. The wavelength conversion member of claim 6, further comprising a sealant positioned between the first substrate and the second substrate in the first direction and positioned between the wavelength conversion layer and the first hydrophobic membrane in the second direction.

8. The wavelength conversion member of claim 4, wherein the second hydrophobic membrane completely encloses the first substrate, the second substrate, and the first hydrophobic membrane.

9. The wavelength conversion member of claim 4, further comprising a third hydrophobic membrane overlapping the second hydrophobic membrane in the second direction,
wherein a material of the third hydrophobic membrane is same as a material of the first hydrophobic membrane.

10. The wavelength conversion member of claim 4, further comprising a fourth hydrophobic membrane positioned between the wavelength conversion layer and at least one of the first substrate and the second substrate,
wherein a material of the fourth hydrophobic membrane is same as a material of the second hydrophobic membrane.

11. The wavelength conversion member of claim 10, wherein the fourth hydrophobic membrane completely encloses at least one of the first substrate and the second substrate.

12. A method for manufacturing a wavelength conversion member, the method comprising:
providing a first substrate, a second substrate, and wavelength conversion layer positioned between the first substrate and the second substrate in a first direction;
providing a first hydrophobic membrane that overlaps at least one of the first substrate, the wavelength conversion layer, and the second substrate in a second direction perpendicular to the first direction; and
providing a second hydrophobic membrane that overlaps the first hydrophobic membrane in the second direction, wherein a material of the second hydrophobic membrane is different from a material of the first hydrophobic membrane.

13. The method of claim 12, wherein the providing the first hydrophobic membrane comprises applying a first hydrophobic solution on one or more side surfaces of at least one of the first substrate, the wavelength conversion layer, and the second substrate using a roller.

14. The method of claim 13, wherein the providing the first hydrophobic membrane further comprises drying the first hydrophobic solution after applying the first hydrophobic solution.

15. The method of claim 12, wherein the second hydrophobic membrane overlaps at least one of the first substrate, the wavelength conversion layer, and the second substrate.

16. The method of claim 15, wherein the providing the second hydrophobic membrane comprises dipping one or more edge portions of at least one of the first hydrophobic membrane, the first substrate, the wavelength conversion layer, and the second substrate in a second hydrophobic solution provided in a container.

17. The method of claim 16, wherein the providing the second hydrophobic membrane further comprises drying a portion of the second hydrophobic solution that is attached to one or more of the first hydrophobic membrane, the first substrate, the wavelength conversion layer, and the second substrate after the dipping.

18. A backlight assembly comprising:
a light source configured to emit first light that has a first wavelength; and
a wavelength conversion member configured to use the first light to generate second light that has a second wavelength different from the first wavelength,
wherein the wavelength conversion member includes:
a first substrate;
a second substrate overlapping the first substrate;
a wavelength conversion layer disposed between the first substrate and the second substrate in a first direction;
a first hydrophobic membrane including an octadecyltrichlorosilane membrane and overlapping at least of the first substrate, the second substrate, and the wavelength conversion layer in a second direction perpendicular to the first direction; and
a second hydrophobic membrane overlapping the first hydrophobic membrane in the second direction,
wherein a material of the first hydrophobic membrane is different from a material of the second hydrophobic membrane.

19. The backlight assembly of claim 18, wherein the wavelength conversion layer includes quantum dots.

20. The backlight assembly of claim 18, wherein the wavelength conversion member further includes a sealant positioned between the first substrate and the second substrate in the first direction and positioned between the wavelength conversion layer and the at least one hydrophobic membrane in the second direction.

\* \* \* \* \*